United States Patent
Kim et al.

(10) Patent No.: US 9,202,492 B2
(45) Date of Patent: Dec. 1, 2015

(54) WAVEGUIDE POWER SENSOR STRUCTURES FREE OF OPTICAL COHERENCE EFFECTS IN A HAMR DRIVE

(71) Applicant: HGST Netherlands B.V., Amsterdam (NL)

(72) Inventors: Seheon Kim, San Jose, CA (US); Takuya Matsumoto, Sunnyvale, CA (US); Shen Ren, Union City, CA (US); Barry C. Stipe, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/265,474

(22) Filed: Apr. 30, 2014

(65) Prior Publication Data

US 2015/0318005 A1 Nov. 5, 2015

(51) Int. Cl.
  *G11B 5/00* (2006.01)
  *G11B 5/48* (2006.01)
  *G11B 5/60* (2006.01)

(52) U.S. Cl.
  CPC .............. *G11B 5/4866* (2013.01); *G11B 5/6088* (2013.01); *G11B 2005/0021* (2013.01)

(58) Field of Classification Search
  None
  See application file for complete search history.

(56) References Cited

U.S. PATENT DOCUMENTS

| 7,480,214 | B2 | 1/2009 | Challener et al. |
| 7,710,686 | B2 | 5/2010 | Kim et al. |
| 8,238,202 | B2 | 8/2012 | Schreck et al. |
| 8,248,898 | B2 | 8/2012 | Schreck et al. |
| 8,339,905 | B2 | 12/2012 | Rausch et al. |
| 8,391,107 | B2 | 3/2013 | Gage et al. |
| 8,861,124 | B1 * | 10/2014 | Finot et al. ................. 360/59 |
| 2008/0204916 | A1 * | 8/2008 | Matsumoto et al. ........... 360/59 |
| 2009/0185459 | A1 * | 7/2009 | Matsumoto ............... 369/13.02 |
| 2013/0142020 | A1 | 6/2013 | Rawat |
| 2013/0142478 | A1 | 6/2013 | Sluzewski et al. |
| 2014/0185979 | A1 * | 7/2014 | Evans et al. ................... 385/14 |

* cited by examiner

*Primary Examiner* — Wayne Young
*Assistant Examiner* — Brian Butcher
(74) *Attorney, Agent, or Firm* — Patterson & Sheridan, LLP

(57) ABSTRACT

Embodiments disclosed herein generally relate to a HAMR device for use in a magnetic reading system. The HAMR device has a primary waveguide extending from a media facing surface to a surface opposite the media facing surface. In one embodiment, the HAMR head has a secondary waveguide having a first and second end positioned within the HAMR head. The secondary waveguide is positioned near the primary waveguide, and the first and second ends of the secondary waveguide are non-reflecting. A thermal sensor is coupled to the secondary waveguide, and responds only to optical power fluctuations in the primary waveguide. In another embodiment, the HAMR head has a second thermal sensor rather than a secondary waveguide. The first thermal sensor and the second thermal sensor are coupled together to act as one optical power sensor and are disposed on the primary waveguide.

14 Claims, 7 Drawing Sheets

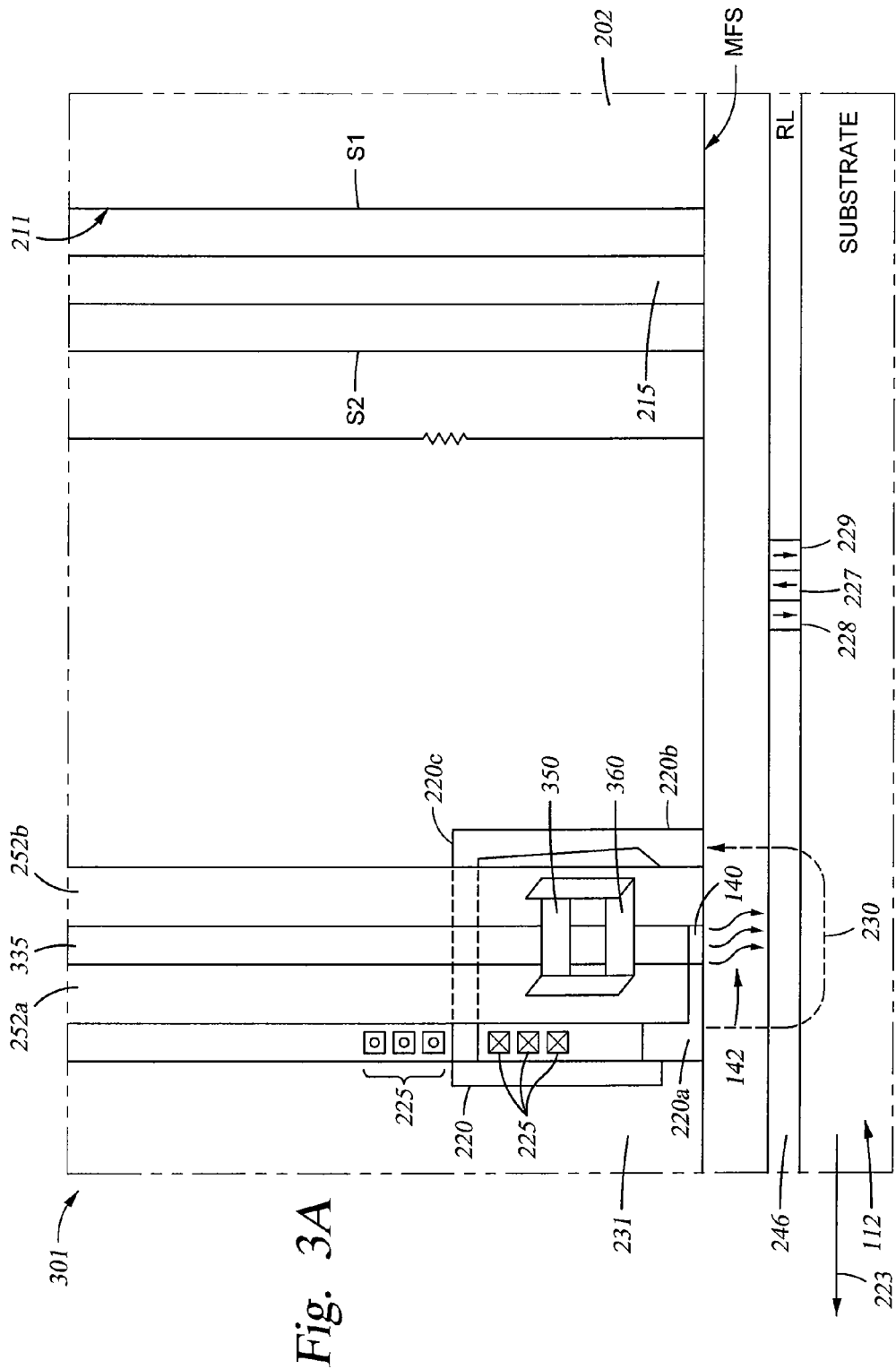

WAVEGUIDE POWER SENSOR STRUCTURES FREE OF OPTICAL COHERENCE EFFECTS IN A HAMR DRIVE

BACKGROUND OF THE INVENTION

1. Field of the Invention

Embodiments disclosed herein generally relate to data storage systems, and more particularly, to thermally assisted recording devices.

2. Description of the Related Art

Higher storage bit densities in magnetic media used in disk drives have reduced the size (volume) of magnetic bits to the point where the magnetic bit dimensions are limited by the grain size of the magnetic material. Although grain size can be reduced further, the data stored within the magnetic bits may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or "heat-assisted magnetic recording" (HAMR) which are used interchangeably herein. HAMR can be applied to longitudinal and perpendicular recording systems as well as "bit patterned media". Heating of the media surface has been accomplished by a number of techniques such as focused laser beams or near-field optical sources.

The optical power in the light delivery path of HAMR heads affects the heating temperature profile, and hence the recording quality during HAMR recording. During writing operations, optical power from a laser diode (LD) may fluctuate due to mode hopping, temperature drift, and LD aging. Monitoring and controlling the optical power may improve HAMR recording quality, reliability and head lifetime. During LD power fluctuation, its wavelength may also vary, causing standing wave patterns to shift. Standing wave patterns may be present in the light delivery path of the HAMR head due to reflections from the magnetic media and the near field transducer (NFT), and can cause optical coherence effects.

Therefore, an improved HAMR device that is less sensitive to or free of optical coherence effects is needed.

SUMMARY OF THE INVENTION

Embodiments disclosed herein generally relate to a HAMR device for use in a magnetic recording system. The HAMR device has a primary waveguide extending from a media facing surface to a surface opposite the media facing surface. In one embodiment, the HAMR head has a secondary waveguide having a first end and second end positioned within the HAMR head. The secondary waveguide is positioned near the primary waveguide, and the first and second ends of the secondary waveguide are non-reflecting. A thermal sensor is coupled to the secondary waveguide, and responds only to optical power variations in the primary waveguide. In another embodiment, the HAMR head has a second thermal sensor rather than a secondary waveguide. The first thermal sensor and the second thermal sensor are coupled together to act as one optical power sensor and are disposed on the primary waveguide.

In one embodiment, a HAMR head comprises a first waveguide with a spot-size converter extending between a media facing surface and a surface opposite the media facing surface, and a second waveguide positioned adjacent the first waveguide and having a first end and a second end position within the heat-assisted magnetic recording head. The first end and the second end of the second waveguide are non-reflecting, and a thermal sensor is disposed on the second waveguide.

In another embodiment, a HAMR head comprises a waveguide, a light source operable at a first frequency and a first sensor coupled to the waveguide. A second thermal sensor is coupled to the first thermal sensor and to the waveguide, and the first thermal sensor and the second thermal sensor are separated by a gap. The gap is equal to a distance of $n+\frac{1}{2}$ periods of a standing wave of the first frequency, where n is an integer.

In another embodiment, a magnetic reading system comprises a rotatable magnetic media, a spindle coupled to the rotatable magnetic media, an actuator, an actuator arm coupled to the actuator, a slider coupled to the actuator arm, and a HAMR head coupled to the slider. The HAMR head comprises a first waveguide with a spot-size converter extending between a media facing surface and a surface opposite the media facing surface, a second waveguide positioned adjacent the first waveguide and having a first end and a second end position within the heat-assisted magnetic recording head, where the first end and the second end of the second waveguide are non-reflecting, and a thermal sensor disposed on the second waveguide.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3B illustrate a cross-sectional schematic diagram of a HAMR enabled head of a disk drive, according to different embodiments of the invention.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments disclosed herein generally relate to a HAMR device for use in a magnetic recording system. The HAMR device has a primary waveguide extending from a media facing surface to a surface opposite the media facing surface. In one embodiment, the HAMR head has a secondary waveguide having a first and second end positioned within the HAMR head. The secondary waveguide is positioned near the primary waveguide, and the first and second ends of the secondary waveguide are non-reflecting. A thermal sensor is coupled to the secondary waveguide, and responds only to optical power fluctuations in the primary waveguide. In another embodiment, the HAMR head has a second thermal sensor rather than a secondary waveguide. The first thermal sensor and the second thermal sensor are coupled together to act as one optical power sensor and are positioned in close proximity to the primary waveguide.

Figure 1A:
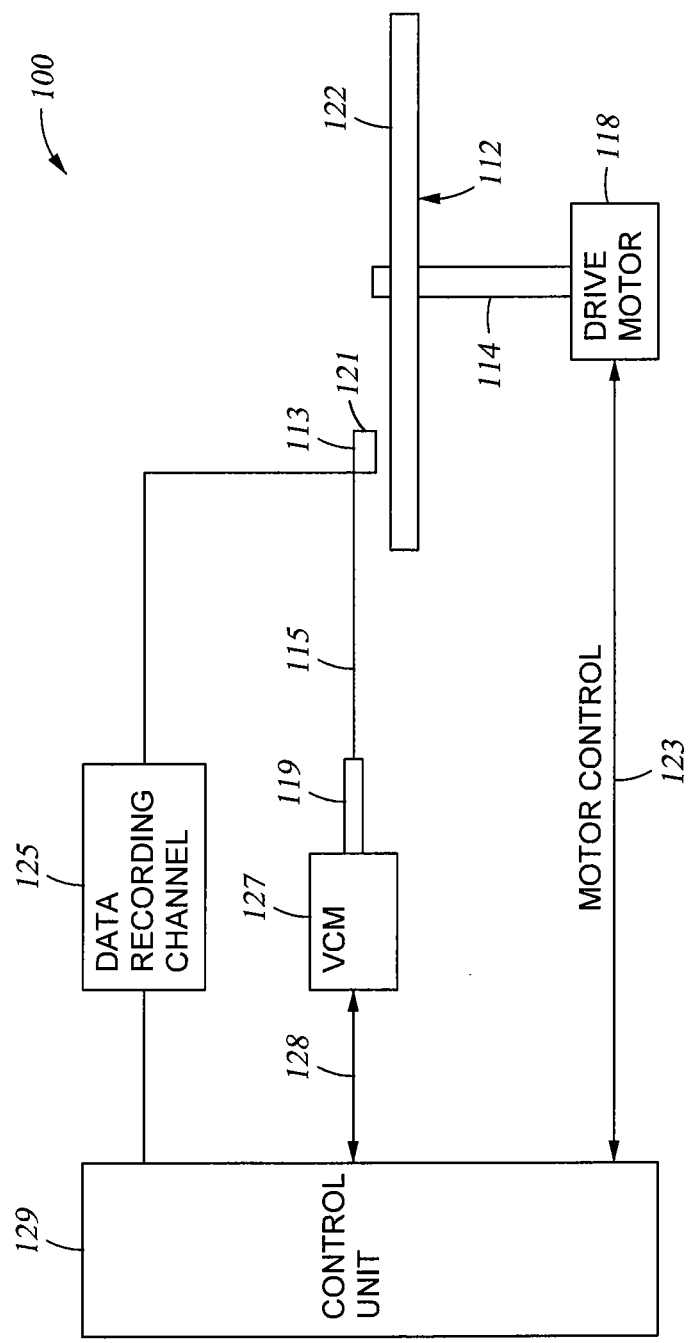
FIGS. 1A-1B illustrate a disk drive system, according to embodiments of the invention.

FIG. 1A illustrates a disk drive 100 embodying this invention. As shown, at least one rotatable magnetic disk or rotatable magnetic media 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk 112 rotates, the slider 113 moves radially in and out over the disk surface 122 so that the magnetic head assembly 121 may access different tracks of the magnetic disk 112 where desired data is written. Each slider 113 is attached to an actuator arm 119 by way of a suspension 115. The suspension 115 provides a slight spring force which biases slider 113 towards the disk surface 122. Each actuator arm 119 is attached to an actuator means 127. The actuator means 127 as shown in FIG. 1A may be a voice coil motor (VCM). The VCM includes a coil movable within a fixed magnetic field, the direction and speed of the coil movements being controlled by the motor current signals supplied by a control unit 129.

During operation of a TAR or HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 slightly above the disk 112 surface by a small, substantially constant spacing during normal operation. The radiation source heats up the high-coercivity data bits so that the write elements of the magnetic head assemblies 121 may correctly magnetize the data bits.

The various components of the disk storage system are controlled in operation by control signals generated by the control unit 129, such as access control signals and internal clock signals. Typically, the control unit 129 includes logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders. Though a disk drive 100 is illustrated, it is to be understood any magnetic reading system could be utilized and is not limited to being a disk drive.

Figure 1B:
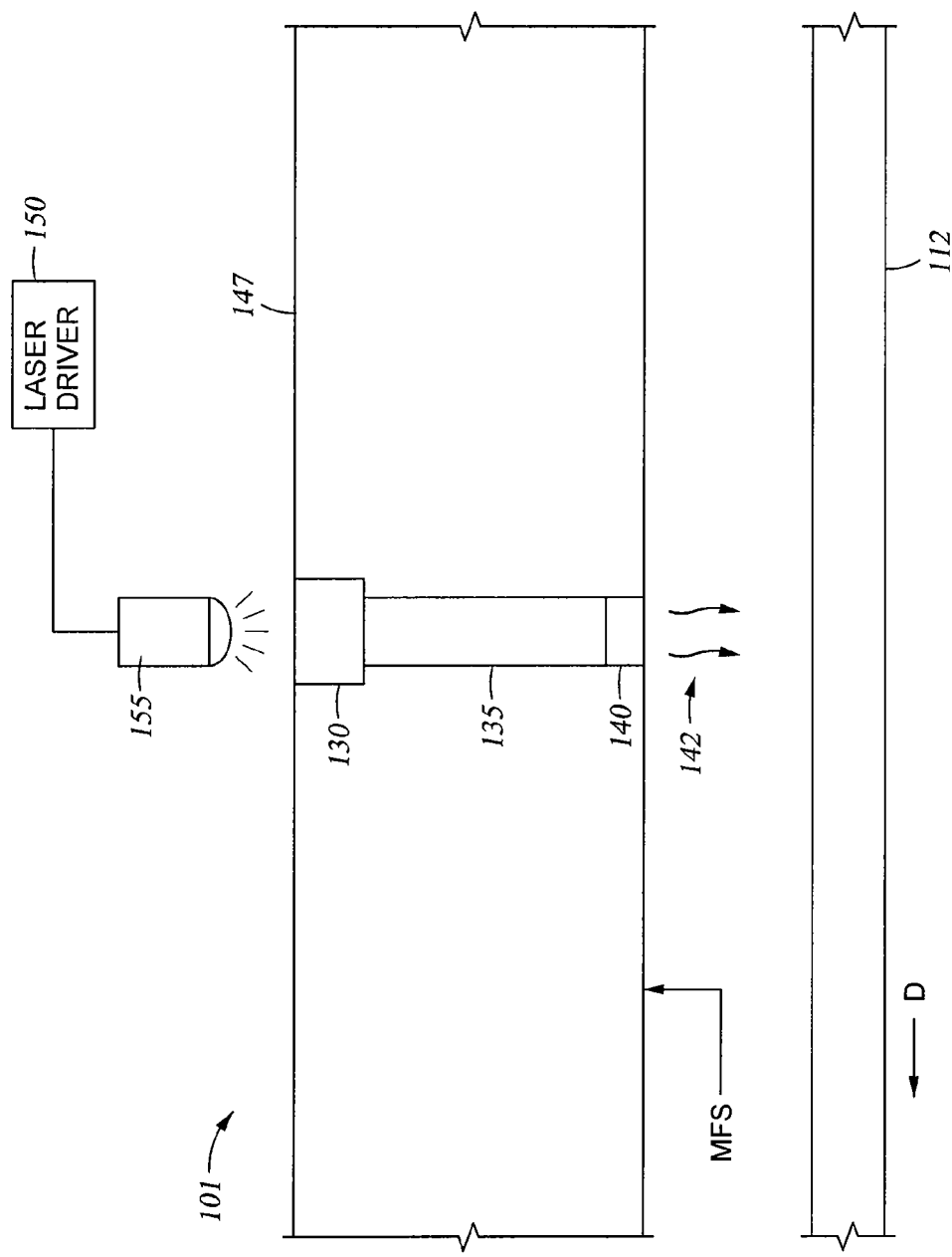

FIG. 1B is a cross sectional schematic of a HAMR enabled write head 101, according to one embodiment of the invention. The head 101 is operatively attached to a laser 155 that is powered by a laser driver 150. The laser 155 may be placed directly on the head 101 or radiation may be delivered from a laser 155 located off the slider 113 through an optical fiber or waveguide 135. Similarly, the laser driver 150 circuitry may be located on the slider 113 or on a system-on-chip (SOC) associated with the disk drive 100 such as the control unit 129. The head 101 includes a spot-size converter 130 for focusing the radiation transmitted by the laser 155 into the waveguide 135. In another embodiment, the disk drive 100 may include one or more lens for focusing the beamspot of the laser 155 before the emitted radiation reaches the spot-size converter 130. The waveguide 135 is a channel that transmits the radiation through the height of the head 101 to a NFT 140—e.g., a plasmonic device or an optical transducer—which is located at or near the media facing surface (MFS). The MFS may be an air-bearing surface (ABS). The waveguide 135 may extend in a direction that is substantially perpendicular to the MFS, as shown in FIG. 1B. Alternatively, the waveguide 135 may not extend in a direction that is substantially perpendicular to the MFS, due to turns in the plane of the substrate or for better coupling to the NFT 140, or the waveguide 135 may be non-linear. The NFT 140 further focuses the beamspot to avoid heating neighboring tracks of data on the disk 112—i.e., creates a beamspot much smaller than the diffraction limit. As shown by arrows 142, this optical energy emits from the NFT 140 to the surface of the disk 112 below the MFS of the head 101. The embodiments herein are not limited to any particular type of NFT and may operate with, for example, either a c-aperature, e-antenna plasmonic near-field source, or any other shaped transducer known in the art.

Figure 2A:
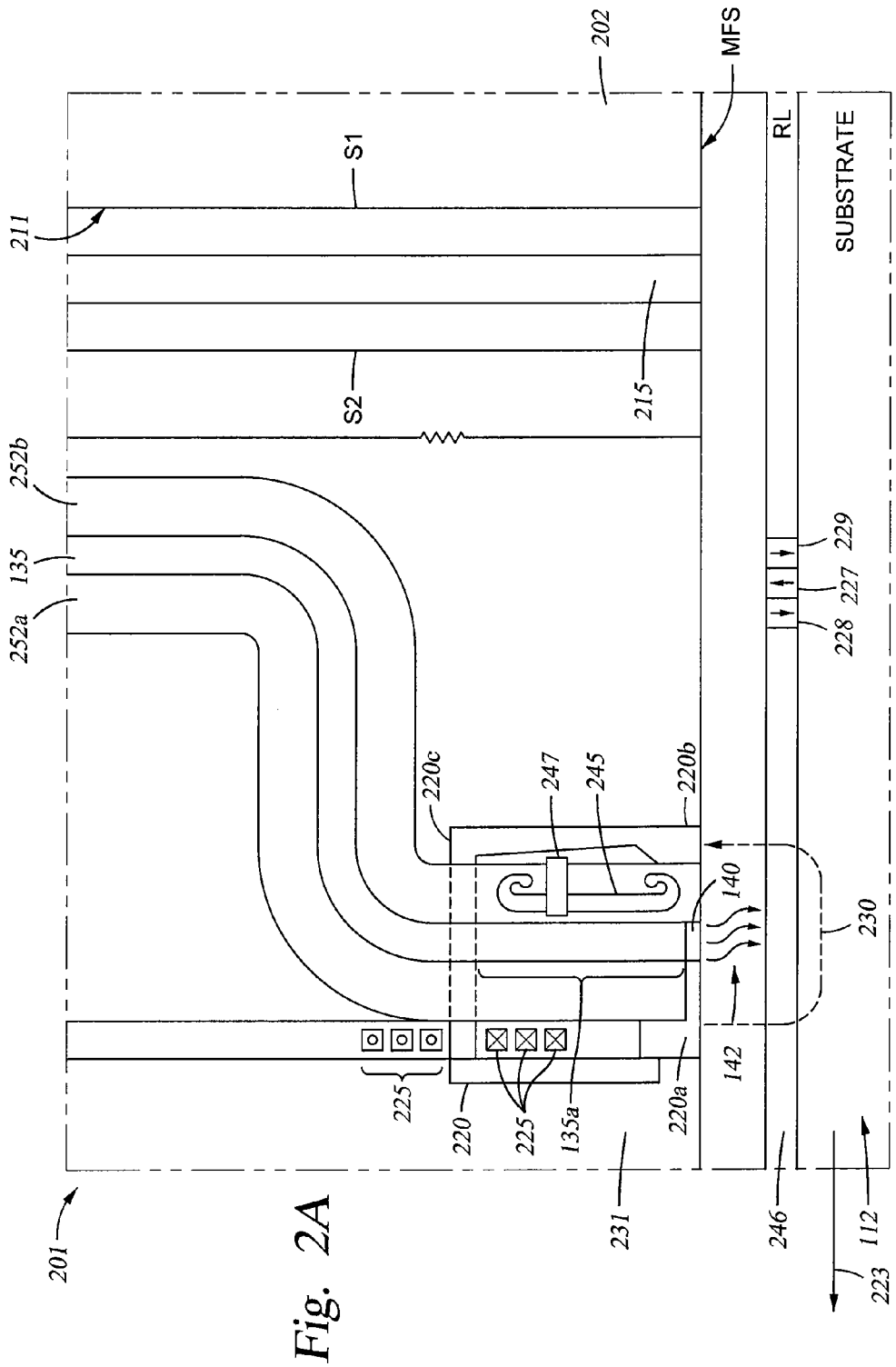
FIGS. 2A-2C illustrate a cross-sectional schematic diagram of a HAMR enabled head of a disk drive, according to different embodiments of the invention.
Figure 2B:
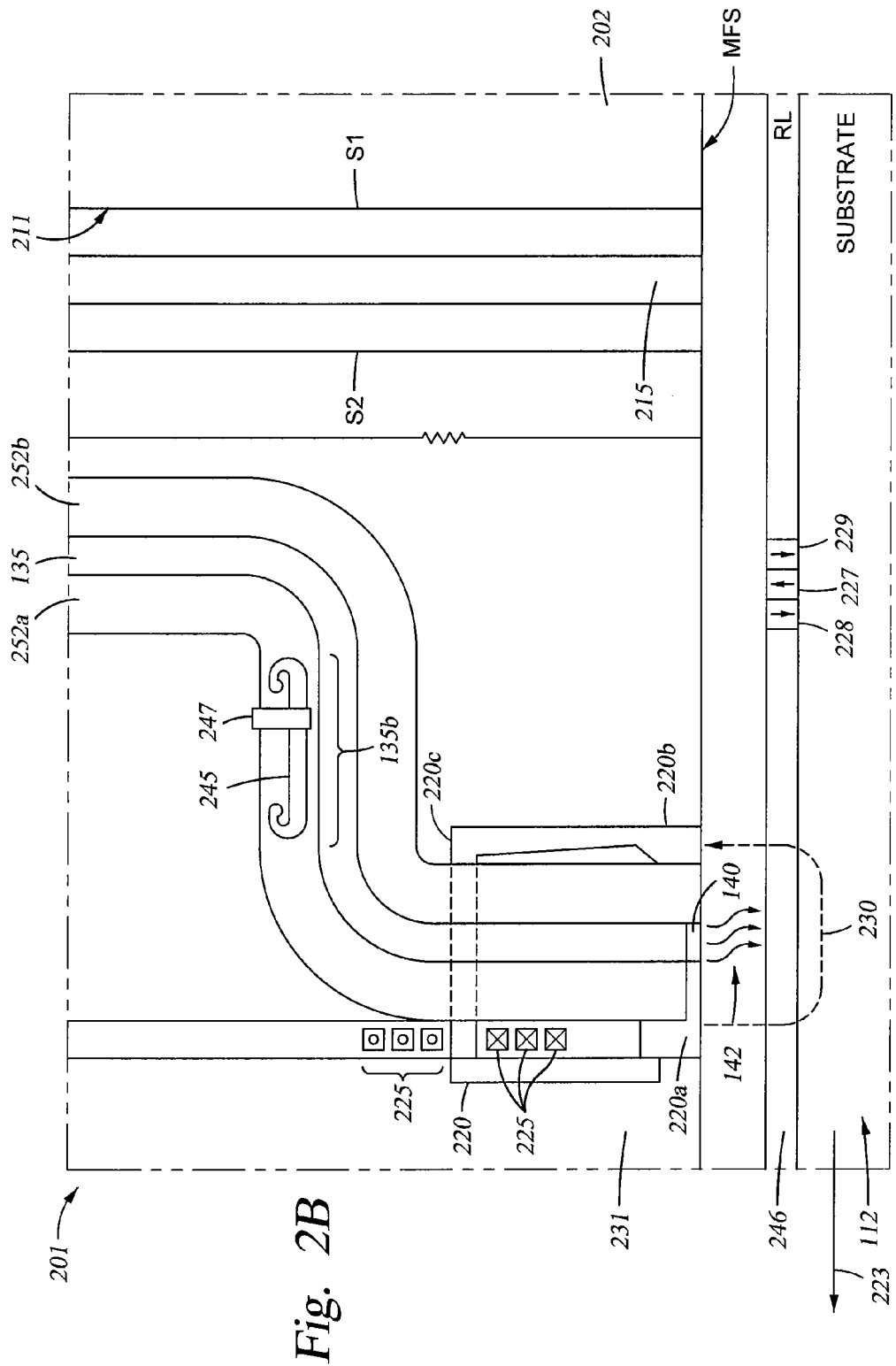
Figure 2C:
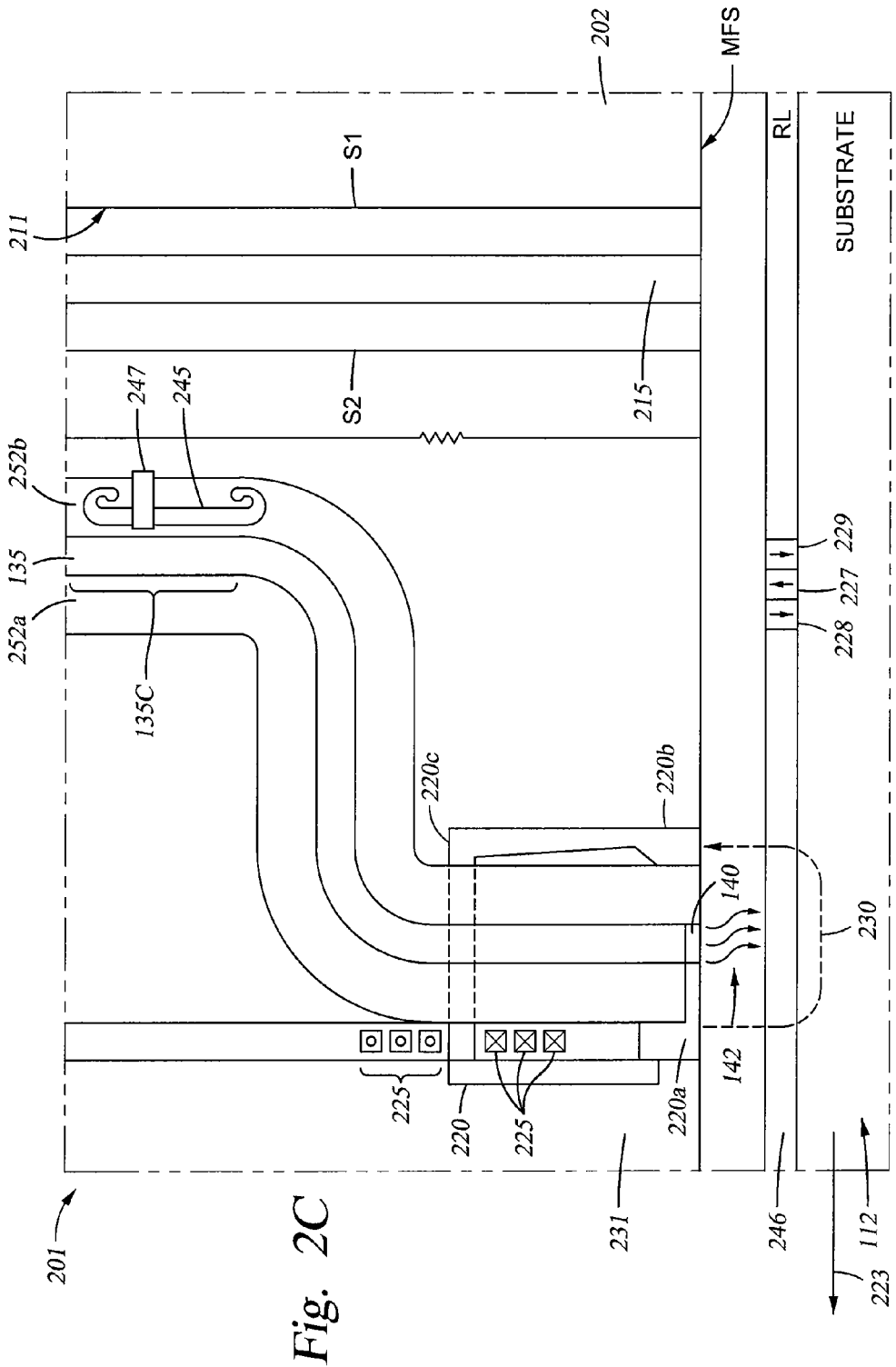

FIGS. 2A-2C and 3A-3B illustrate a cross-sectional schematic diagram of a HAMR enabled recording head, according to one embodiment. Specifically, a portion of a head 201 and associated perpendicular magnetic recording disk 112 for a HAMR disk drive which uses two optical channels or waveguides 135, 245 in combination for directing optical power to the disk. In FIGS. 2A-2C, the first waveguide 135 may have a spot-size converter on the end that is opposite to the MFS. The disk 112 includes a disk substrate and a perpendicular magnetic recording layer (RL) 246. In one embodiment, the disk 112 may include an optional "soft" or relatively low-coercivity magnetically permeable underlayer (SUL). However, the SUL is not required for a HAMR disk drive 100.

The RL 246 may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd). The RL 246 may also be an $L1_0$ ordered alloy such as FePt or FeNiPt. The disk 112 may also include a protective overcoat (not shown) over the RL 246.

The head 201 is formed on a substrate 202 and has a substrate trailing surface 211 and a MFS surface oriented generally perpendicular to trailing surface 211. The substrate 202 is typically formed of a composite material, such as a composite of alumina/titanium-carbide ($Al_2O_3$/TiC), and supports the read and write elements which are typically formed as a series of thin films and structures on the trailing surface 211. The disk 112 may spin in a direction 223 away from the trailing surface 211 and towards the other layers of the head 201. The MFS is the recording-layer-facing surface of the slider that faces the disk 112. Note that FIGS. 2A-2C and 3A-3B are not drawn to scale because of the difficulty in showing the very small features and, for the sake of clarity, omits structures from the head such as spacing and insulating layers.

The head 201 includes a magnetoresistive read pole 215 located between shields S1 and S2, and a perpendicular write head that includes a magnetic yoke 220 with a write pole 220a and a return pole 220b, and an electrically conductive coil 225. The write pole 220a is formed of a high-moment material, such as a NiFe or FeCoNi alloy. The write coil 225 is wrapped around the yoke 220 with the electrical current directions being shown as into the paper by the coil cross-sections marked with an "X" and out of the paper by the coil cross-sections marked with a solid circle. When write-current pulses are directed through the coil 225, the write pole 220a directs magnetic flux, represented by arrow 230, to the RL 246. Further, the magnetic flux 230 continues through the substrate or a SUL layer before arriving at the return pole 220b. However, the embodiments are not limited to the structure and material discussed above. For example, the coil 225 may be a helical coil or the write pole 220a may include a wrap-around shield. Further, the present invention may operate with any recording head that can perform the functions discussed herein.

The head 201 may also include the primary waveguide 135 and a secondary waveguide 245 with the NFT 140 near or at the MFS. As shown, the waveguide 135 and NFT 140 extend through the yoke 220 and are located between the write pole 220a and the return pole 220b. As noted by the ghosted lines, the yoke 220 may continuously connect the write pole 220a to the return pole 220b with a magnetic member 220c. The waveguides 135, 245 are formed of a high-index-of-refraction dielectric material that is transmissive to radiation at the wavelength of the laser radiation source—e.g., around 780 nm. Typical radiation-transmissive materials include, for example, $TiO_2$ and $Ta_2O_5$. The primary radiation-transmissive waveguide 135 and the secondary waveguide 245 are surrounded by a cladding material 252a, 252b that has a lower refractive index than the waveguides 135, 245 such as $SiO_2$ and $Al_2O_3$. The primary waveguide 135 may be located between shield S2 and return pole 220b, or between the write pole 220a and the outer face 231 of the head 201 (if the disk 112 rotates opposite of the direction 223 shown).

While writing to the disk 112, the RL 246 moves relative to the head 201 in the direction shown by arrow 223. In HAMR, the optical energy 142 emitted from the NFT 140 temporarily heats up and lowers the coercivity ($H_c$) of the RL 246 so that the magnetic recording regions 227, 228, 229 may be oriented by the write field from write pole 220a. The magnetic recording regions 227, 228, 229 become oriented by the write field if the write field ($H_w$) is greater than $H_c$. After a region of the RL 246 in the data track has been exposed to $H_w$ from the write pole 220a and the resulting heat from the optical energy 142 from the NFT 140, the region's temperature falls below the Curie temperature and the data associated with the magnetic orientations is recorded. Specifically, the transitions between recorded regions (such as previously recorded regions 227, 228, and 229) represent written data "bits" that can be read by the read pole 215. In this manner, the NFT 140 uses the optical energy 142 to heat the RL layer 246 and lower its magnetic coercivity.

In FIG. 2A, the first waveguide 135 is the primary waveguide, which transmits radiation from the laser 155 through the height of the head 201 to the NFT 140. The first waveguide 135, which has a spot-sized converter having an S-like shape, extends from the MFS to a surface opposite the MFS. The second waveguide 245, or secondary waveguide, is positioned near, but not in contact with, the first waveguide 135, and is perpendicular to the MFS. The secondary waveguide 245 has a first end and a second end positioned entirely within the head 201, and do not fully extend between two surfaces of the head 201 as the primary waveguide 135 does. The first end and the second end of the secondary waveguide 245 are non-reflecting. The non-reflecting ends eliminate any standing wave patterns that may occur in the secondary waveguide 245. The first end and the second end of the secondary waveguide 245 may be in the shape of a spiral with a progressively reduced bending radius, making the first end and the second end non-reflective and allowing the optical power to be dissipated through scattering due to waveguide bending loss. The reduced bending radius of the spiral shape of the first and second ends of the second waveguide 245 is gradual, and as such, very little power is reflected back.

A thermal sensor 247, or waveguide sensor, is disposed on the secondary waveguide 245 and monitors the optical power of the primary waveguide 135. In FIG. 2A, the thermal sensor 247 is parallel with the MFS. The waveguide sensor 247 may be a thermistor or resistance temperature detector (RTD) where the electrical resistance of the material comprising the waveguide sensor 247 changes as the temperature of the material varies. As the light from the laser 155 goes through the first waveguide 135, a fraction of the optical power is transferred to the second waveguide 245, heating the waveguide sensor 247, causing the resistance of the waveguide sensor 247 to change. The resistance of the waveguide sensor 247 is directly related to the primary waveguide 135 power. Thus, a change in the optical power of the primary waveguide 135 results in a direct change in the resistance of the waveguide sensor 247. The waveguide sensor 247 may be electrically coupled to the laser driver 150 or some other control device to measure the electrical resistance of the waveguide sensor 247. This change may then be used as a feedback control signal to adjust the power of the laser 155. This feedback control permits the disk drive 100 to perform HAMR at a sufficient temperature with controlled track width and without damaging the head 201 by, for example, pole-tip protrusion or metal diffusion of the near-field transducer.

In order for the optical power to transfer from the primary waveguide 135 to the secondary waveguide 245, the primary waveguide 135 and the secondary waveguide 245 should be parallel to one another. A straight portion 135a of the primary waveguide 135 is adjacent and perpendicular to the MFS. The secondary waveguide 245 is parallel to the straight portion 135a of the primary waveguide 135. At least a straight portion of the secondary waveguide 245 should be adjacent a straight portion 135a of the primary waveguide 135 to allow optical power to jump from the primary waveguide 135 to the secondary waveguide 245. This jump, or transfer, of optical power from the primary waveguide 135 to the secondary waveguide 245 allows the thermal sensor 247 to operate. The straight portion 135a of the primary waveguide 135 may be longer in length than the secondary waveguide 245, as shown in FIG. 2A.

Optical power may be transferred from the first waveguide 135 to the second waveguide 245 through a directional coupler. The thermal sensor 247 responds only to forward propagating power in the head 201, and does not respond to backward propagating power or wavelength drift. In one embodiment, the thermal sensor 247 is between about 200 nm and 500 nm in length.

FIG. 2B illustrates an alternative embodiment of the HAMR head 201, according to one embodiment. FIG. 2B is similar to FIG. 2A, with the exception of the location of the secondary waveguide 245 and the thermal sensor 247. The primary waveguide 135 still has a spot-sized converter with an S-like shape, and extends from the MFS to the surface opposite the MFS. The thermal sensor 247 is coupled to the secondary waveguide 245, and the secondary waveguide 245 may no longer be positioned near the NFT 140. In FIG. 2B, the secondary waveguide 245 is positioned very near, but not in contact with, the primary waveguide 135 and is further away in location from the MFS. At least a straight portion of the secondary waveguide 245 is adjacent to a straight portion 135b of the primary waveguide 135. The straight portion 135b of the primary waveguide 135 is parallel to the MFS, the secondary waveguide 245 is positioned parallel to the MFS and the thermal sensor 247 is perpendicular to the MFS. As long as the secondary waveguide 245 remains parallel to the MFS and in close proximity to the primary waveguide 135, it may be positioned at any location within the head 201, such as near the MFS or near the surface opposite the MFS. The first end and the second end of the secondary waveguide 245 may be in the shape of a spiral with a progressively reduced bending radius, to reduce reflections, and thus, eliminate any standing wave patterns in the secondary waveguide 245. The secondary waveguide 245 may have a length greater than, equal to or less than the straight portion 135b of the primary waveguide 135.

FIG. 2C illustrates an alternative embodiment of the HAMR head 201, according to one embodiment. FIG. 2C is similar to both FIG. 2A and FIG. 2B, with the exception of the location of the secondary waveguide 245 and the thermal sensor 247. The primary waveguide 135 has a spot-sized converter with an S-like shape, and extends from the MFS to the surface opposite the MFS. The thermal sensor 247 is coupled to the secondary waveguide 245, and the secondary waveguide 245 is no longer positioned near the NFT 140. In FIG. 2C, the secondary waveguide 245 is in close proximity to the surface opposite the MFS, near the laser 155. At least a straight portion of the secondary waveguide 245 is adjacent to a straight portion 135c of the primary waveguide 135. The straight portion 135c of the primary waveguide is perpendicular to the MFS and is positioned near the surface opposite the MFS. The secondary waveguide 245 is perpendicular to the MFS and the thermal sensor 247 is parallel to the MFS. The first end and the second end of the secondary waveguide 245 may be in the shape of a spiral with a progressively reduced bending radius, to reduce reflections, and thus, eliminate any standing wave patterns in the secondary waveguide 245. The secondary waveguide 245 may be longer in length than the straight portion 135c of the primary waveguide 135, as shown in FIG. 2C.

FIG. 3A illustrates an alternative embodiment of a HAMR head 301, according to one embodiment. HAMR head 301 is similar to HAMR head 201, however in HAMR head 301, there is one waveguide 335 and two thermal sensors 350, 360. A light source, such as laser 155, operable at a first frequency is delivered though the primary waveguide 335. The two thermal sensors 350, 360 are coupled to the primary waveguide 335. Both the first thermal sensor 350 and the second thermal sensor 360 are connected to a positive electrical pad and a negative electrical pad on both ends. The first and second thermal sensors 350, 360 are connected together in parallel, where the positive electrical pad is on one end, the negative electrical pad is on the opposite end, and the first and second thermal sensors 350, 360 are disposed in the middle between the two electrical pads, with both thermal sensors 350, 360 in contact with both electrical pads. The first and second sensors 350, 360 are parallel to the MFS while the two electrical pads are perpendicular to the MFS. The first and second thermal sensors 350, 360 may be located near the NFT 140, or the first and second thermal sensors 350, 360 may be positioned closer to the surface opposite the MFS. The primary waveguide 335 may be straight or with a spot-sized converter.

The first thermal sensor 350 and the second thermal sensor 360 work together to comprise one functional sensor that is responsive only to the optical power of the waveguide 335. The first thermal sensor 350 and the second thermal sensor 360 have a combined resistance, which assist in making the thermal sensors 350, 360 independent of a standing wave pattern shift at a first frequency.

The centers of the first thermal sensor 350 and the second thermal sensor 360 are separated by a gap. The gap is equal to a distance of n+½ periods of a standing wave at the first frequency, n being an odd integer. The period of the standing wave at the first frequency can be calculated using Equation 1:

$$Lp = \lambda/(2n_{eff})$$ (Equation 1)

where Lp is the standing wave period, λ is the wavelength and $n_{eff}$ is the effective mode index. After calculating the standing wave period, the distance of the gap can then be calculated using Equation 2:

$$L = (n+½)Lp$$ (Equation 2)

where L is the distance of the gap and n is an integer.

The distance of the gap between the first thermal sensor 350 and the second thermal sensor 360 is chosen so that the first thermal sensor 350 is always on a peak of the standing wave at the first frequency while the second thermal sensor 360 is on a valley of the standing wave at the first frequency. The position of the thermal sensors 350, 360 are interchangeable so that the first thermal sensor 350 may be on a valley of the standing wave while the second thermal sensor 360 may be on a peak of the standing wave. By making the distance of the gap equal to a distance of n+½ periods of the standing wave at the first frequency, n being an integer, the thermal sensors 350, 360 are independent of the standing wave pattern shift.

Figure 3B:
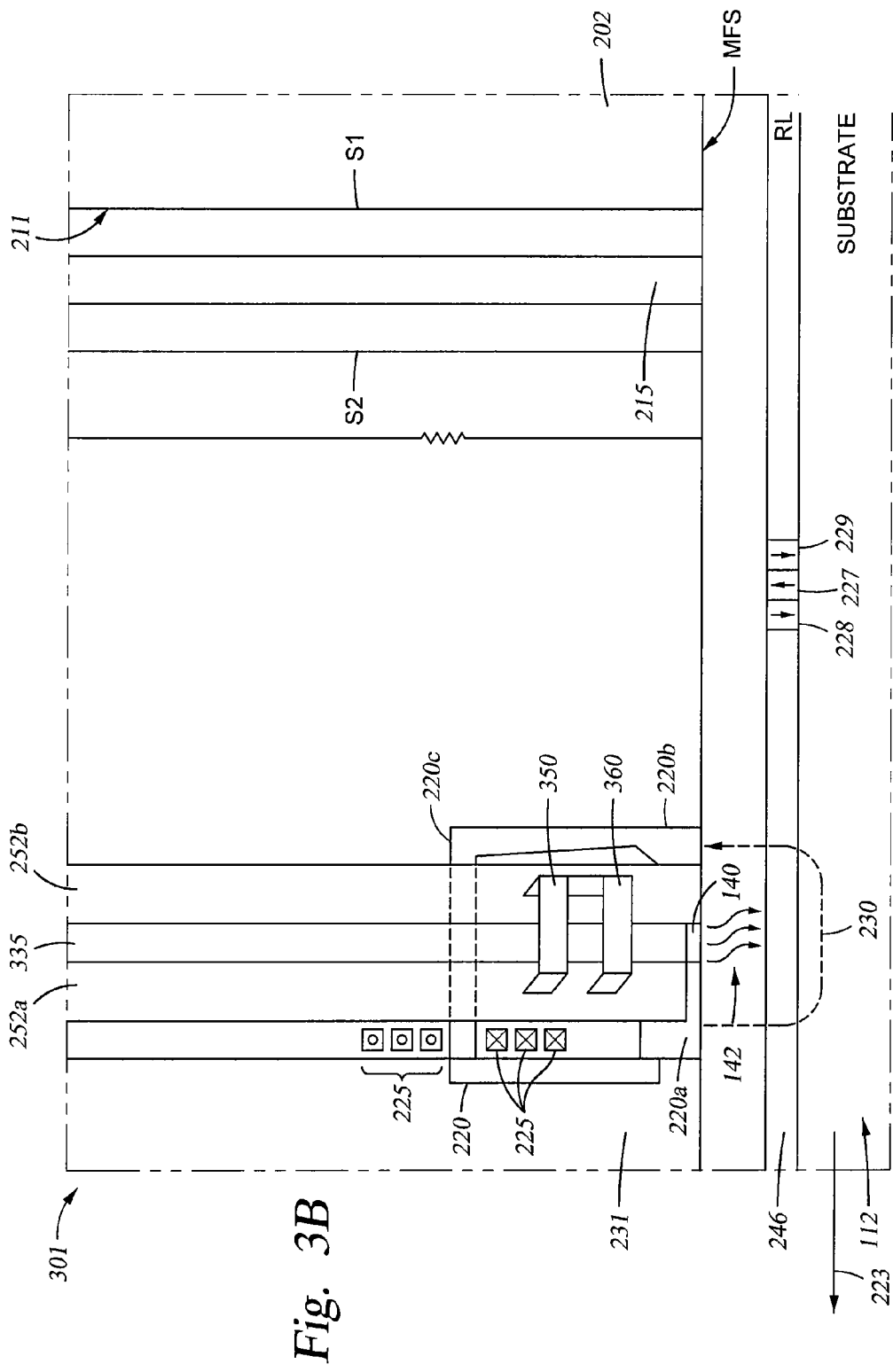

Having the first thermal sensor 350 on a peak and the second thermal sensor 360 on a valley of the standing wave at the first frequency, or vice-versa, yields a higher absorption percentage than the thermal sensors 350, 360 individually on either a peak or a valley of the standing wave. Since the relative position of the thermal sensors 350, 360 are complementary with respect to the standing wave pattern within the waveguide, the combined signal of the two has much less amplitude variations due to optical coherence. FIG. 3B illustrates an alternative embodiment of a HAMR head 301, according to one embodiment. FIG. 3B is similar to FIG. 3A with the exception of how the first thermal sensor 350 and the second thermal sensor 360 are connected. In FIG. 3B, the first thermal sensor 350 and the second thermal sensor 360 are connected together in series, with the first thermal sensor 350 being coupled to the positive electrical pad and the second thermal sensor 360 being coupled to the negative electrical pad. Since the thermal sensors 350, 360 are connected in series, both the positive electrical pad and the negative electrical pad are located on the same side of the waveguide 335, and neither the first thermal sensor 350 nor the second thermal sensor 360 are in contact with both electrical pads. The first thermal sensor 350 may be coupled to the negative electrical pad while the second thermal sensor 360 may be coupled to the positive electrical pad. The positive electrical pad or the negative electrical pad may be located more towards the MFS on the waveguide 335. The first and second thermal sensors 350, 360 are parallel to the MFS, and the electrical pads are perpendicular to the MFS. The thermal sensors 350, 360 are still separated by a gap equal to the distance of n+½ periods of a standing wave at a first frequency, n being an integer, making the waveguide 335 independent of the standing wave pattern shift at the first frequency.

The embodiments as discussed above all result in an improved HAMR device that is less sensitive to or free of optical coherence effects, and the optical power through a primary waveguide is successfully monitored and controlled.

While the foregoing is directed to embodiments of the present invention, other and further embodiments of the invention may be devised without departing from the basic scope thereof, and the scope thereof is determined by the claims that follow.

What is claimed is:

1. A heat-assisted magnetic recording head, comprising: a first waveguide with a spot-sized converter extending between a media facing surface and a surface opposite the media facing surface; a second waveguide positioned adjacent to and spaced from the first waveguide and having a first end and a second end, wherein both the first end and the second end are positioned within the heat-assisted magnetic recording head and between and spaced apart from the media facing surface and the surface opposite the media facing surface, and wherein the first end and the second end of the second waveguide are non-reflecting; and a thermal sensor disposed on the second waveguide and spaced from both the first end and the second end.

2. The heat-assisted magnetic recording head of claim 1, wherein the first end and the second end of the second waveguide are in the shape of a spiral.

3. The heat-assisted magnetic recording head of claim 1, wherein a straight portion of the second waveguide is positioned parallel to a straight portion of the first waveguide.

4. The heat-assisted magnetic recording head of claim 3, wherein the straight portion of the second waveguide and the straight portion of the first waveguide are positioned perpendicular to the media facing surface.

5. The heat-assisted magnetic recording head of claim 3, wherein the straight portion of the second waveguide and the straight portion of the first waveguide are positioned parallel to the media facing surface.

6. The heat-assisted magnetic recording head of claim 1, wherein the thermal sensor has a length of about 200 nm.

7. The heat-assisted magnetic recording head of claim 1, wherein the first waveguide has an S shape.

8. A magnetic recording system, comprising: an actuator; an actuator arm coupled to the actuator; a slider coupled to the actuator arm; and a heat-assisted magnetic recording head coupled to the slider, comprising; a first waveguide with a spot-sized converter extending between a media facing surface and a surface opposite the media facing surface; a second waveguide positioned adjacent the first waveguide and having a first end and a second end, wherein both the first end and the second end are positioned within the heat-assisted magnetic recording head and between and spaced apart from the media facing surface and the surface opposite the media facing surface, and wherein the first end and the second end of the second waveguide are non-reflecting; and a thermal sensor disposed on the second waveguide and spaced from both the first end and the second end.

9. The magnetic recording system of claim 8, wherein the first end and the second end of the second waveguide are in the shape of a spiral.

10. The magnetic recording system of claim 8, wherein a straight portion of the second waveguide is positioned parallel to a straight portion of the first waveguide.

11. The magnetic recording system of claim 10, wherein the straight portion of the second waveguide and the straight portion of the first waveguide are positioned perpendicular to the media facing surface.

12. The magnetic recording system of claim 10, wherein the straight portion of the second waveguide and the straight portion of the first waveguide are positioned parallel to the media facing surface.

13. The magnetic recording system of claim 8, wherein the thermal sensor has a length of about 200 nm.

14. The magnetic recording system of claim 8, wherein the first waveguide has an S shape.

* * * * *